United States Patent Office 3,354,177
Patented Nov. 21, 1967

3,354,177
PROCESS FOR THE PRODUCTION OF N-2-ACYLOXYETHYL-PHTHALIMIDES
Wolfgang Seeliger, Marl, Germany, assignor to Chemische Werke Huls A.G., Marl, Germany
No Drawing. Filed July 30, 1965, Ser. No. 476,207
Claims priority, application Germany, Aug. 13, 1964, C 33,626
19 Claims. (Cl. 260—326)

This invention relates to an improved process for the production of N-2-acyloxyethyl-phthalimides.

It is known that N-2-acyloxyethyl-phthalimides can be produced by reacting phthalic acid anhydride with $\Delta^2$-oxazolines (U.S. Patent No. 2,547,542). In this process, however, it is necessary to perform a first step of producing the $\Delta^2$-oxazolines from the corresponding $\beta$-hydroxyethyl-carbonamides.

A principal object of this invention, therefore, is to provide a novel, more direct route for the synthesis of N-2-acyloxyethyl-phthalimides.

Upon further study of the specification and claims, other objects and advantages of the present invention will become apparent.

To attain these objects, there is provided a process for the production of N-2-acyloxyethyl-phthalimides of the formula

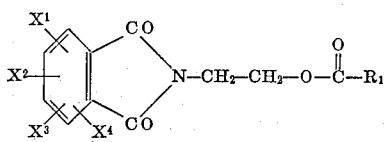

wherein
$X^1$, $X^2$, $X^3$ and $X^4$, being the same or different, each represents hydrogen, halogen (Cl, F, I, Br), alkyl of preferably 1–7 carbon atoms, or carboxyalkyl of preferably 1–8 carbon atoms, or $X^1$, $X^2$, $X^3$ and $X^4$ together forming a closed aromatic ring (e.g., the final product being a naphthalene derivative); and
$R_1$ represents hydrogen, alkyl or preferably 1–18 carbon atoms, alkenyl of preferably 2–18 carbon atoms, phenyl, or alkylphenyl wherein the alkyl group contains 1–4 carbon atoms, said process comprising reacting, at 100–250° C. a phthalic acid anhydride compound of the formula

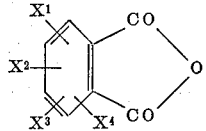

wherein $X^1$, $X^2$, $X^3$ and $X^4$ are defined as above, with a $\beta$-hydroxyethyl-carbonamide of the formula

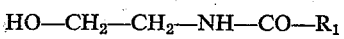

HO—CH$_2$—CH$_2$—NH—CO—R$_1$ wherein $R_1$ has the previously indicated meaning.

Because phthalic acid anhydride is well known to be an effective esterification agent, it was assumed prior to this invention that a reaction between phthalic acid anhydride and a $\beta$-hydroxyethyl-carbonamide would rapidly yield the corresponding acid esters of phthalic acid. Instead, however, under the conditions of this invention, the corresponding N-2-acyloxyethyl-phthalimides are surprisingly formed.

Whereas it is preferred to employ phthalic acid anhydride itself for the reaction, it is nevertheless also possible to employ substituted phthalic acid anhydrides corresponding to the above-mentioned formula. Such substituted phthalic acid anhydrides include, for example, 3- and/or 4-methyl-, ethyl-, n-propyl-, isopropyl-, chloro-, or bromophthalic acid anhydride, 3-carboxymethyl- or 3-carboxyethylphthalic acid anhydride, 3,4-dichloro- and/or dibromophthalic acid anhydride, or naphthalene-1,2-dicarboxylic acid anhydride, tetramethyl-, tetrachloro-phthalic acid anhydride, 4-n-butyl-5-chloro-, 4-methyl-5,6-dibromo- and 4-methyl-5-carboxy-n-butyl-phthalic acid anhydride.

The particularly preferred $\beta$-hydoxyethyl-carbonamide is 2-hydroxyethyl-acetamide. Other suitable $\beta$-hydroxyethyl-carbonamides include, for example, 2-hydroxyethyl-formamide, -acetamide, -propionamide, -butyramide, -acrylamide, -methacrylamide, -benzamide, -o, m, p-toluylamide, -laurinamide, -palmitinamide, -stearinamide, -oleinamide, -capronamide, -caprylamide, -crotonamide, m-n-butylbenzamide.

The reactants generally are utilized in equimolar proportions, but a small excess of, for example, 0.1 to 10% of either the phthalic acid anhydride or the $\beta$-hydroxyethyl-carbonamide is not harmful. (Of course, like most reactions, even a huge excess of one of the reactants still results in a finite yield of product).

Generally, the reaction is conducted in the absence of solvents; however, it can be advantageous, particularly when employing reactants having a higher melting point, to use inert solvents, such as xylene, pseudocumene, chlorobenzene, or dichlorobenzene.

The reaction is conducted at temperatures above 100° C., particularly at 120–250° C., and more preferably at 150–240° C.

Advantageously, the reaction is conducted in the presence of a catalytic quantity of a strong acid, such as, for example, a mineral acid such as sulfuric acid or phosphoric acid, an aromatic sulfonic acid such as benzenesulfonic acid, and particularly p-toluenesulfonic acid, or in general any acid which is not volatile or is only slightly volatile under reaction conditions. Preferably acids are used having an ionization constant of at least $10^{-3}$, preferably at least $10^{-2}$ (in aqueous solution at 25° C.). The quantity of catalyst which is employed amounts generally to 0.01 to 10% by weight, preferably from 0.01 to 5% by weight, based on the total weight of reactants.

For conducting the process, the reactants are mixed in the optional presence of the above-disclosed solvents, and heated to the reaction temperature, preferably with stirring. Reactants can also be heated to the reaction temperature and then are mixed.

The water formed by the reaction is, if desired, removed together with the solvent by distillation. The crude N-2-acyloxyethyl-phthalimide remaining as the residue can be purified by any conventional technique, such as by washing with water; by recrystallization, preferably from methanol, ethanol, propanol, isopropanol, butanol, benzene, or from the corresponding water-alcohol mixtures; by distillation, preferably under vacuum; or by sublimation.

By the process of this invention, N-2-acyloxyethyl-phthalimides are produced in a simple manner and in excellent yields and, of moist importance, an entire reaction step of the prior art is eliminated.

The N-acyloxyethyl-phthalimides produced by this invention are advantageously employed as intermediates in the production of N-vinyl-phthalimides, or by themselves as plasticizers or flame retardants in admixture with plastics.

Without further elaboration, it is believed that one skilled in the art can, using the preceding description utilize the present invention to its fullest extent. The following preferred specific embodiments are, therefore, to be construed as merely illustrative, and not limitative, of the remainder of the specification and claims in any way whatsoever.

*Example 1*

103 parts by weight of 2-hydroxyethyl-acetamide (1 mole), 148 parts by weight of phthalic acid anhydride (1 mole), and 5 parts by weight of p-toluenesulfonic acid hydrate are mixed together and heated with stirring, first to 150° C., and then slowly up to a bath temperature of 200° C. At 150° C., water begins to evolve, the total quantity of evolved water amounting to 19 parts by weight. After cooling, there are obtained 236 parts by weight of crude β-phthaliminoethyl acetate crystals. By recrystallization from a mixture of equal parts by volume of water and methanol, the compound is obtained in pure form and melts at 84–85° C.

By infrared and elementary analyses, constitution and purity are confirmed.

*Analysis.*—C, 6.18; H, 4.8; O, 27.5; N, 5.9. Calculated: C, 61.8; H, 4.7; O, 27.5; N, 6.0.

The yield is practically quantitative.

*Example 2*

According to the method described in Example 1, 82.5 parts by weight of 2-hydroxyethyl-benzamide (0.5 mole), 74 parts by weight of phthalic acid anhydride (0.5 mole), and 2 parts by weight of p-toluenesulfonic acid hydrate are maintained for 2 hours at a bath temperature of 155–165° C. After the residue is recrystallized from methanol, the yield in pure β-phthaliminoethyl benzoate (M.P. 115–116° C.) amounts to 126 parts by weight, corresponding to 85.5% of theory.

*Example 3*

Example 2 is repeated in the absence of p-toluenesulfonic acid and at a bulk temperature which reaches 190° C. After recrystallization from methanol, there are obtained 96 parts by weight of pure β-phthaliminoethyl benzoate, corresponding to 65% of theory.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of N-2-acyloxy-ethyl-phthalimides of the formula

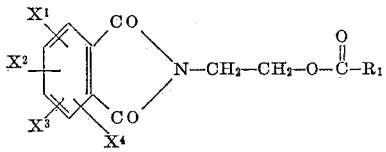

wherein $X^1$, $X^2$, $X^3$ and $X^4$ each represents hydrogen, halogen, alkyl of 1–7 carbon atoms, carboxyalkyl of 1–8 carbon atoms, or $X^1$, $X^2$, $X^3$ and $X^4$ together represent a closed aromatic ring; and $R_1$ represents hydrogen, alkyl of 1 to 18 carbon atoms, alkenyl of 2 to 18 carbon atoms, phenyl, or alkylphenyl wherein the alkyl group contains 1 to 4 carbon atoms, said process comprising reacting, at 100–250° C., a phthalic acid anhydride compound of the formula

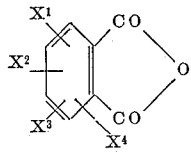

wherein $X^1$, $X^2$, $X^3$ and $X^4$ are defined as above, with a β-hydroxyethyl-carbonamide of the formula $$HO-CH_2-CH_2-NH-CO-R_1$$

wherein $R_1$ has the previously indicated meaning.

2. A process as defined by claim 1 wherein the reaction is conducted at 120–250° C.

3. A process as defined by claim 1 wherein the reaction is conducted in the presence of a catalytic quantity of a strong acid.

4. A process as defined by claim 1 wherein the reaction is conducted in the presence of 0.01–10% by weight of a strong acid, based on the weight of the reactants.

5. A process as defined by claim 1 wherein the phthalic acid anhydride compound is selected from the group consisting of phthalic acid anhydride, and 3-methyl, 4-methyl, 3,4-dimethyl, ethyl, propyl, isopropyl, chloro, bromo, 3-carboxymethyl, 3-carboxyethyl, 3,4-dichloro, and 3,4-dibromo phthalic acid anhydride, and naphthalene-1,2-dicarboxylic acid anhydride; and wherein the β-hydroxyethyl-carbonamide is selected from the group consisting of 2 - hydroxyethyl - formamide, -acetamide, -propionamide, -butyramide, -acrylamide, -methacrylamide, -benzamide, -toluylamide, -laurinamide, -palmitinamide, -stearinamide, -oleinamide, -capronamide, -caprylamide, -crotonamide, m-n-butylbenzamide.

6. A process as defined by claim 5 wherein the reaction is conducted at 120–250° C.

7. A process as defined by claim 5 wherein the reaction is conducted in the presence of a catalytic quantity of a strong acid.

8. A process as defined by claim 5 wherein the reaction is conducted in the presence of 0.01–10% by weight of a strong acid, based on the weight of the reactants.

9. A process as defined by claim 8 wherein the strong acid is p-toluenesulfonic acid.

10. A process as defined by claim 1 wherein the phthalic acid anhydride compound is phthalic acid anhydride.

11. A process as defined by claim 10 wherein the reaction is conducted at 120–250° C.

12. A process as defined by claim 10 wherein the reaction is conducted in the presence of a catalytic quantity of a strong acid.

13. A process as defined by claim 10 wherein the reaction is conducted in the presence of 0.01–10% by weight of a strong acid, based on the weight of the reactants.

14. A process as defined by claim 13 wherein the strong acid is p-toluenesulfonic acid.

15. A process as defined by claim 1 wherein the β-hydroxyethyl-carbonamide is β-hydroxyethyl-acetamide.

16. A process as defined by claim 15 wherein the reaction is conducted at 120–250° C.

17. A process as defined by claim 15 wherein the reaction is conducted in the presence of a catalytic quantity of a strong acid.

18. A process as defined by claim 15 wherein the reaction is conducted in the presence of 0.01–10% by weight of a strong acid, based on the weight of the reactants.

19. A process as defined by claim 18 wherein the strong acid is p-toluenesulfonic acid.

References Cited

UNITED STATES PATENTS

| | | | |
|---|---|---|---|
| 2,329,619 | 9/1943 | Jayne et al. | 260—307 |
| 2,547,542 | 4/1951 | Rowland | 260—326 |
| 2,814,626 | 11/1957 | Meiser et al. | 260—307 |

OTHER REFERENCES

Elderfield, Heterocyclic Compounds, vol. 5, New York, John Wiley & Sons, 1957, p. 386.

ALEX MAZEL, *Primary Examiner.*

M. O'BRIEN, *Assistant Examiner.*